United States Patent
Rehkemper

(10) Patent No.: US 6,732,973 B1
(45) Date of Patent: May 11, 2004

(54) STABILIZER FOR A PROPELLER RELATED VEHICLE

(75) Inventor: Jeffrey Rehkemper, Chicago, IL (US)

(73) Assignee: Rehco, LLC, Chicago, IL (US)

(*) Notice: Subject to any disclaimer, the term of this patent is extended or adjusted under 35 U.S.C. 154(b) by 0 days.

(21) Appl. No.: 10/277,691

(22) Filed: Oct. 23, 2002

Related U.S. Application Data

(63) Continuation-in-part of application No. 10/189,681, filed on Jul. 8, 2002.
(60) Provisional application No. 60/348,891, filed on Jan. 14, 2002, and provisional application No. 60/337,670, filed on Nov. 7, 2001.

(51) Int. Cl.[7] .............................................. B64C 27/00
(52) U.S. Cl. .................... 244/17.11; 446/37; 244/17.19
(58) Field of Search ........................... 244/17.25, 17.19, 244/51; 416/131, 135, 244 R, 148; 446/36, 34, 37, 39

(56) References Cited

U.S. PATENT DOCUMENTS

| | | | | | |
|---|---|---|---|---|---|
| 2,650,667 | A | * | 9/1953 | Young | 416/131 |
| 3,391,746 | A | * | 7/1968 | Cardoso | 416/128 |
| 4,708,591 | A | * | 11/1987 | Roman | 416/102 |
| 4,759,689 | A | * | 7/1988 | Roman | 416/148 |
| 4,881,874 | A | * | 11/1989 | White et al. | 416/138 |
| 5,511,947 | A | * | 4/1996 | Schmuck | 416/131 |

FOREIGN PATENT DOCUMENTS

JP    05050993 A  *  3/1993  ........... B64C/11/12

* cited by examiner

Primary Examiner—Peter M. Poon
Assistant Examiner—Timothy D. Collins

(57) ABSTRACT

A stabilizer attached between a propeller and a shaft; and the propeller is pivotally mounted to the shaft in a substantially perpendicular plane to the shaft. The stabilizer has a tendency to exert a reactionary force on the propeller, when the propeller pivots in relation to the shaft, such that the reactionary force tends to return the propeller in the substantially perpendicular plane.

11 Claims, 2 Drawing Sheets

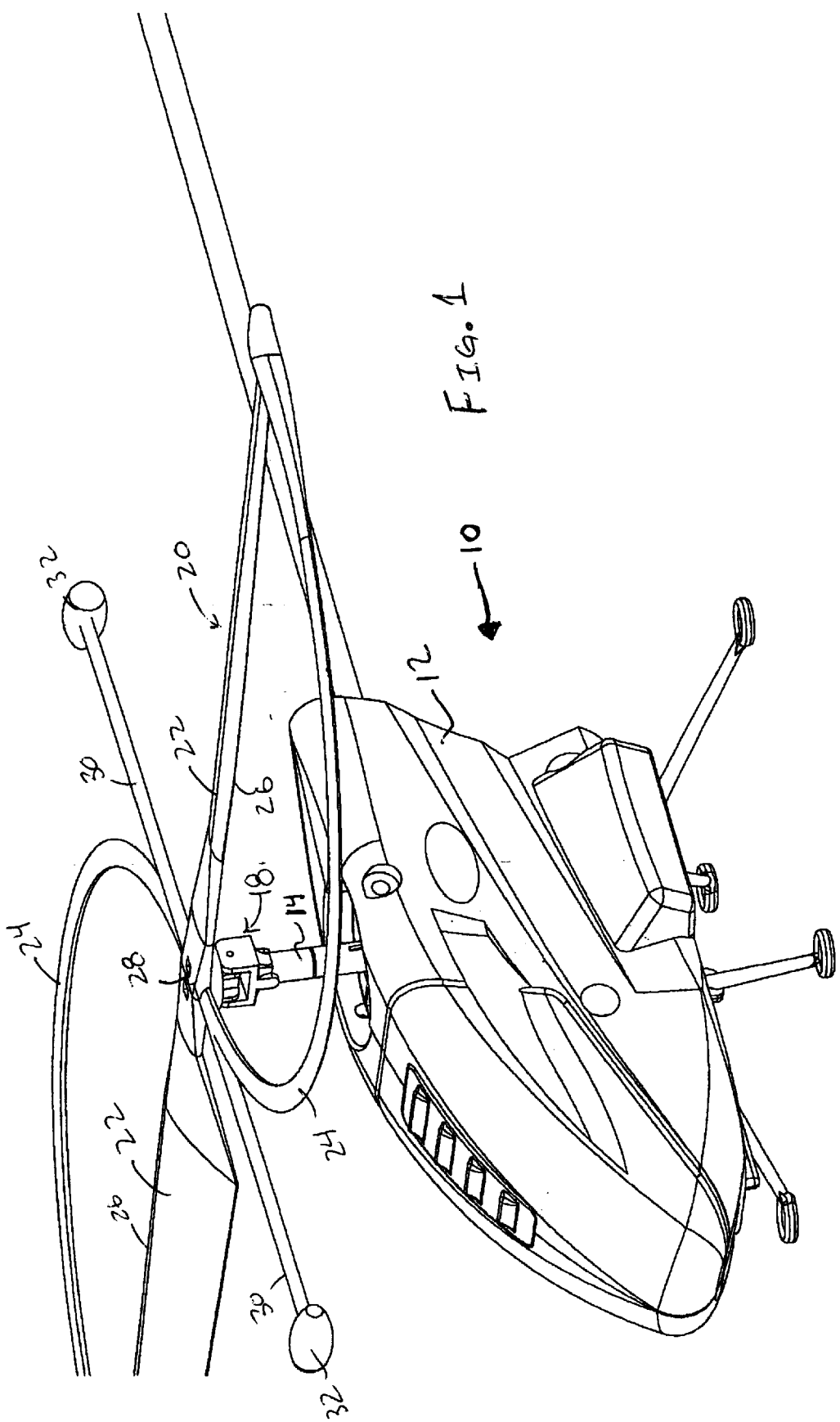

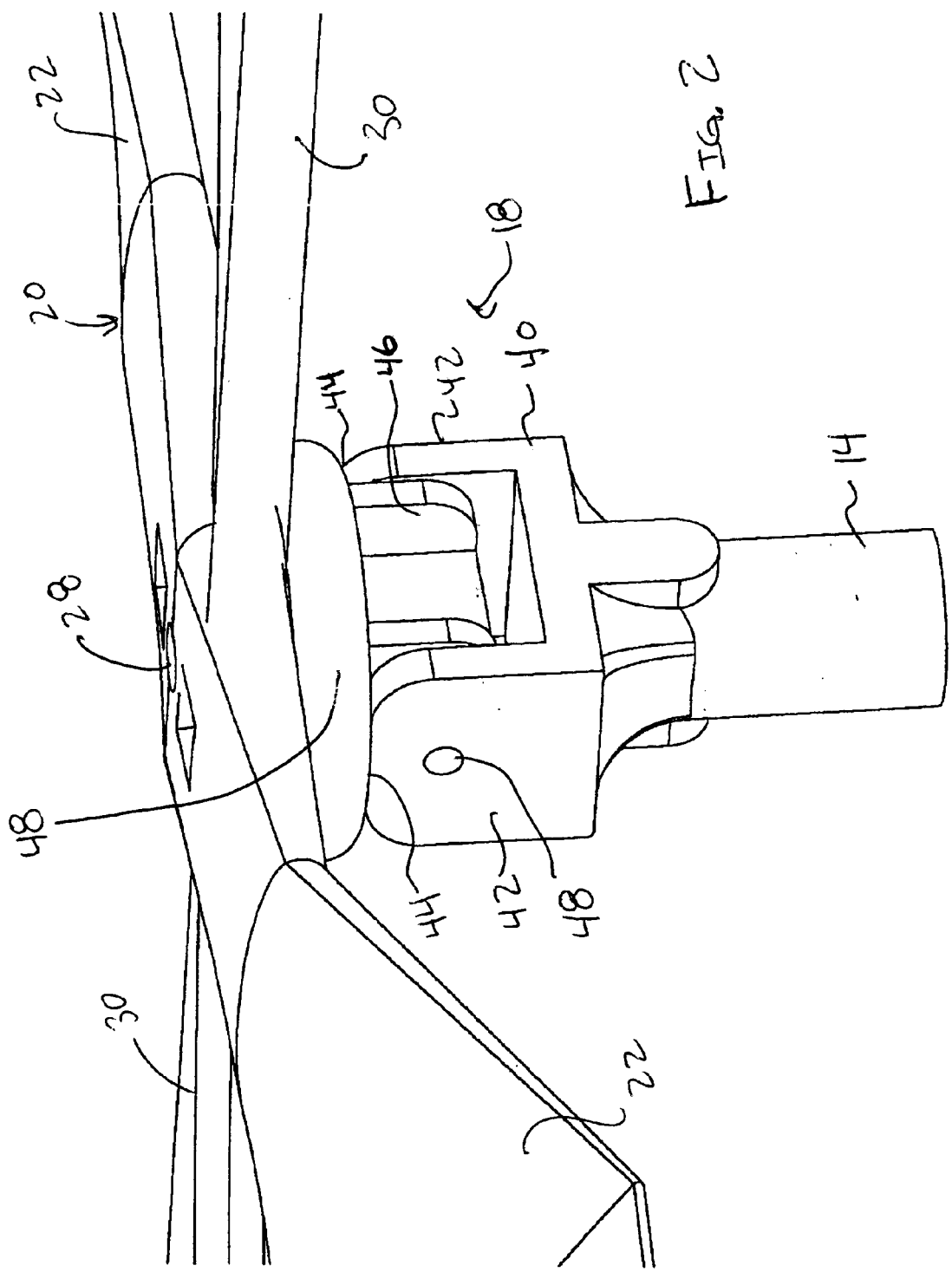

STABILIZER FOR A PROPELLER RELATED VEHICLE

CROSS-REFERENCE TO RELATED APPLICATIONS

This application claims the benefit of U.S. Provisional Patent Application having Ser. No. 60/337,670 and filed on Nov. 7, 2001 and claims the benefit of U.S. Provisional Patent Application having Ser. No. 60/348,891 and filed on Jan. 14, 2002 and hereby incorporates both provisional applications by reference.

This application is also a continuation in part of U.S. application Ser. No. 10/189,681 entitled "Propellers and Propeller Related Vehicles" filed Jul. 8, 2002 and hereby incorporates the application by reference.

This application is also related to U.S. application Ser. No. 10/277,844 entitled "Pneumatic Driven Propeller Related Vehicles" filed Oct. 23, 2002 and hereby incorporates the application by reference.

FIELD OF THE INVENTION

This invention relates generally to stabilizers for propeller related vehicles and more particular to vehicles, such as air, land and water vehicles, that use or incorporate propellers to create lift or as a means for propulsion, and for most aspects the present invention relate to air based vehicles designed for the toy or hobby industry.

BACKGROUND OF THE INVENTION

While the present invention is related in part to vehicles developed in the toy and hobby industry. There are many types of vehicles that use propellers as a source of lift or as a means for propulsion. The more common types of these vehicles are air/space based vehicles such as airplanes, helicopters, or unconventional aircraft. In general such aircraft require complex programming and mechanics to control the flight path and are especially difficult to control. In most instances, controlling these aircraft to fly in a stable horizontal position takes countless hours of practice.

Examples of these prior art aircraft may be found in the following U.S. Patents; U.S. Pat. No. 5,609,312 is directed to a model helicopter that describes an improved fuselage with a structure that supports radio-control components, and drive train components in an attempt to provide a simple structure; U.S. Pat. No. 5,836,545 is directed to a rotary wing model aircraft that includes a power distribution system that efficiently distributes engine power to the rotary wings and tail rotor system; U.S. Pat. No. 5,879,131 is directed to a main propeller system for model helicopters that are capable of surviving repeated crashes; and U.S. Pat. No. 4,604,075 is directed to a toy helicopter that includes a removable control unit, which a user may plug into the toy helicopter.

These toys use at least one propeller rotating in a substantially horizontal plane to create and sustain lift. One problem that arises is when the propellers are rotating in the horizontal plane, variations such as wind or power fluctuations may cause the propeller blades to pitch, which further causes the aircraft to tip, turn, oscillate or bank. This effect may be compensated for and corrected with complicated programming and mechanics. However, as mentioned above these have a tendency to make the aircraft too expensive or too difficult to control, especially for children. The ability to even maintain horizontal stability in these aircrafts is extremely difficult.

As such a need exists to improve these aircrafts that utilize propellers to create and sustain lift to overcome the problems identified above. Such a need should be inexpensive and easy to implement. The outcome should further provide for aircrafts that are easy to control or manipulate without the need for complex linkages, servos, gyros or other electromechanical devices.

SUMMARY OF THE INVENTION

The present invention for a propeller related vehicle includes in accordance with one embodiment of the present invention a horizontal stabilizing means attached between a main propeller and a main drive shaft. The horizontal stabilizing means permits the main propeller to rotate and pivot about the main drive shaft independently from the airframe. However, when the main propeller is rotating and begins to pivot about the main drive shaft, the horizontal stabilizing means tends to return the main propeller in a substantially horizontal position.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein:

FIG. 1 is a perspective view of a propeller related vehicle, namely a helicopter, with a horizontal stabilizing means in accordance with the present invention; and FIG. 2 is a close-up view of the horizontal stabilizing means.

DETAILED DESCRIPTION OF THE INVENTION

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Referring now to FIGS. 1 and 2, a propeller related vehicle is illustrated in but one embodiment of the present invention as a helicopter 10. The helicopter 10 includes a body 12 that houses various components. These components may include electrical and/or mechanical components when the helicopter is of a type similar to a remote control or free-flight electrically operated helicopter such as disclosed in the Assignee's commonly owned application entitled "Propellers and Propeller Related Vehicles" U.S. application Ser. No. 10/189,681; or may include components that permit the helicopter to operated pneumatically with a pneumatic engine such as disclosed in the Assignee's commonly owned application entitled "Pneumatic Driven Propeller Related Vehicles" U.S. application Ser. No. 10/277,844.

Attached through the body 12 is a main drive shaft 14 that is rotated by a motor mechanism (not shown), which as mentioned above could be either pneumatically or electrically operated. The end of the main drive shaft 14 is attached to a horizontal stabilizing means 18 which is pivotally attached to a main propeller 20, such that when the main drive shaft 14 rotates the main propeller 20 will also rotate.

As partially depicted in FIG. 1, the main propeller 20 includes a pair of opposing positioned blades 22 with safety arcs 24, either elliptical or circular, in front of the leading edges 26 of both blades 22. In addition, extending outwardly from the center 28 of the main propeller 20 is a pair of fly bars 30 with weighted ends 32. The fly bars 30 add extra stability to this propeller configuration and also reduces the effect wind may have on the main propeller 20. When the main propeller 20 is rotating, centrifugal force pulls the weighted ends 32 of the fly-bars 30 straight out, making the main propeller 20 more stable by reducing the case the main propeller 20 may pivot during operation. However, any propeller may be attached to the present horizontal stabilizing means 18, such as a simple dual blade propeller; a propeller with a half safety ring described in commonly assigned U.S. Design application Ser. No. 29/158,997; or additional propeller configurations described in commonly assigned U.S. application Ser. No. 10/189,681.

The horizontal stabilizing means 18, illustrated more closely in FIG. 2, includes a shaft joint 40 secured to the end of the main drive shaft 14. The shaft joint 40 includes leg portions 42 that may be rounded about the ends 44. The shaft joint 40 is sized to receive a propeller joint 46, which is attached to the center 28 of the main propeller 20. The two joints 40 and 46 are pivotally attached together about a pivot pin 48. Fitted around the propeller shaped joint 46 and positioned between the ends 44 of the shaft joint 40 and the main propeller 20 is a stabilizer or resilient O-ring 48.

When the main propeller 20 is rotating and the main propeller 20 begins to pivot away from a substantially horizontal plane, the ends 44 of the shaft joint 40 press into a portion of the resilient O-ring 48. As the O-ring 48 tends to maintain its original form, the resiliency of the O-ring 48 exerts a reactionary force on the shaft joint 40. This in turn causes the main propeller 20 to pivot in an opposite direction, which eventually places the main propeller in a substantially horizontal plane or position. The reactionary force may also overcompensate, causing the main propeller 20 to pivot past the horizontal plane, which will cause the ends 44 of the shaft joint 40 to press into another portion of the O-ring 48. However, a new reactionary force would then compensate for this creating a diminishing oscillation or vacillation until the main propeller is in a substantially horizontal plane.

In addition, it is preferable to align the blades 22 of the main propeller 20 along a perpendicular plane to the pivot plane. Thereby, when the main propeller 20 includes fly bars, the fly bars and/or weighted ends will help increase stability maintained by the horizontal stabilizing means 18.

Referring again to FIG. 1 the helicopter 10 may also include vertical stabilizing means such as a rudder or vertical propellers. The helicopter 10 may yet also include landing gear to keep the helicopter level on the ground or the surface.

During operation, the present invention will allow the helicopter 10 to lift straight up and maintain a hover or stationary position. The helicopter 10 may include several forms of control, starting with no control or "free flight," or it may be outfitted with electronics having a microprocessor for "preprogrammed" or "programmable" flight or it may be outfitted with a radio receiver for use with a hand held remote transmitter or it may be any combination of the above.

In addition, the present invention is applicable to an aircraft having one or more propellers that rotate in a horizontal plane, either powered or freely rotatable. Each propeller is attached to a corresponding shaft that extends vertically through the airframe. The aircraft further includes the horizontal stabilizing means (which includes the propeller joint 46, the shaft joint 40 and the resilient O-ring 48) attached between each propeller and the corresponding shaft, which permits the propeller to pivot in relation to the corresponding shaft. However, when a propeller that is rotating begins to pivot, the O-ring 48 (or horizontal stabilizer) offsets the pivot such that the propeller remains in a substantially horizontal plane.

It is also easy to implement and foresee the O-ring and pair of joints, of the present invention, being used in a vertically mounted propeller, to create a vertical stabilizing means. This may be used in any vertically mounted propeller, such as in planes, tail rotors in helicopter, air boats, etc. The resiliency of the O-ring would exert a force on the propeller mount regardless of the plane the stabilizing means was mounted. In such circumstances, the propeller would preferably be mounted to a corresponding shaft in a substantially perpendicular plane to the corresponding shaft.

From the foregoing and as mentioned above, it will be observed that numerous variations and modifications may be effected without departing from the spirit and scope of the novel concept of the invention. For example, the propeller, while shown may be used in airplanes, may find further applications in other propeller driven vehicles, either miniature or life-size, such as but not limited to water driven vehicles (such as boats and submarines), land driven vehicles (such as propeller operated cars) and other air driven vehicles (such as rockets) as well as other products that use propellers. It is to be understood that no limitation with respect to the specific methods and apparatus illustrated herein is intended or should be inferred.

We claim:

1. A helicopter including a motor mechanism to rotate a drive shaft that pivotally attaches to and rotates a main propeller, the helicopter further comprising:

said main propeller having a pair of blades extending outwardly from the drive shaft alone a substantially horizontal position, and having a pair of flybars extending outwardly from the drive shaft along said horizontal plane and directed to rotate in a same direction as the pair of blades; and a horizontal stabilizer attached between the drive shaft and the main propeller, the horizontal stabilizer including a means to exert a reactionary force on the main propeller, when the main propeller pivots in relation to the drive shaft, wherein the reactionary force tends to place the main propeller in the substantially horizontal position and wherein when the main propeller is rotating and begins to pitch, the flybars rotating therewith have a mass that aids in returning the propeller to the substantially horizontal position.

2. The helicopter of claim 1, wherein the horizontal stabilizer includes:

a first U-shaped joint secured to the drive shaft, the first U-shaped joint having a pair of legs, each leg includes an end that is substantially rounded;

a second U-shaped joint secured to the main propeller;

a pivot pin pivotally attaching the second U-shaped joint to the first U-shaped joint such that the ends of each leg of the first U-shaped joint is positioned substantially toward the main propeller; and a resilient O-ring positioned between the ends of the first U-shaped joint and the main propeller, whereby the resilient O-ring will exert a reactionary force on the main propeller, when the main propeller pivots in relation to the drive shaft such that the reactionary force tends to return the main propeller to the substantially horizontal position.

3. A vehicle comprising:

a propeller pivotally mounted to a shaft and in a substantially perpendicular plane to the shaft, said propeller having a pair of blades extending outwardly from the shaft along said substantially perpendicular plane, each blade having a leading edge, a proximal end defined as an end proximal to the shaft and a distal end, and a safety arc attached to the proximal and distal ends of each blade and positioned in front of the leading edge of each blade; and a stabilizing means attached between the propeller and the shaft, when the propeller pivots in relation to the shaft, the stabilizing means includes a means to exert a reactionary force on the propeller, such that the reactionary force tends to place the propeller in said substantially perpendicular plane to the shaft.

4. The vehicle of claim 3, wherein the stabilizing means comprises:

a propeller joint secured to the propeller;

a shaft joint secured to the shaft, and the propeller joint is pivotally attached to the shaft joint; and a resilient O-ring positioned between the propeller joint and the shaft joint such that the shaft joint presses into the O-ring, when the propeller pivots in relation to the shaft.

5. The vehicle of claim 4, wherein the propeller is mounted in a substantially horizontal plane.

6. The vehicle of claim 4, wherein the propeller is mounted in a substantially vertical plane.

7. The vehicle of claim 1, wherein each blade has a leading edge, a proximal end defined as an end proximal to the drive shaft and a distal end, and the main propeller further includes a safety arc attached to the proximal and distal ends of each blade and positioned in front of the leading edge of each blade.

8. The vehicle of claim 3, wherein the main propeller includes a pair of flybars extending outwardly from said shaft along said substantially perpendicular plane and wherein when the propeller is rotating and the propeller begins to pitch the flybars rotating therewith have a mass that tends to pivot the blades about the stabilizing means in a manner that offsets the pitch such that the propeller tends to return to said substantially perpendicular plane to the shaft.

9. A helicopter including a motor mechanism to rotate a drive shaft that pivotally attaches to and rotates a main propeller, the helicopter further comprising:

a horizontal stabilizer attached between the drive shaft and the main propeller, the horizontal stabilizer includes a resilient O-ring and a first U-shaped joint secured to the drive shaft, the first U-shaped joint having a pair of legs and the resilient O-ring is positioned between the uppermost ends of the pair of legs of the first U-shaped joint and positioned against the main propeller, wherein the resilient O-ring will exert a reactionary force on the main propeller when the main propeller pivots in relation to the drive shaft such that the reactionary force tends to return the main propeller to the substantially horizontal position.

10. The helicopter of claim 9 wherein the main propeller includes a pair of blades extending outwardly from the drive shaft along a substantially horizontal position, and having a pair of flybars extending outwardly from the drive shaft along said horizontal plane and directed to rotate in a same direction as the pair of blades, whereby when the main propeller is rotating and begins to pitch, the flybars rotating therewith have a mass that aids in returning the propeller to the substantially horizontal position.

11. The helicopter of claim 10 wherein each blade has a leading edge, a proximal end defined as an open end proximal to the drive shaft and a distal end, and the main propeller further includes a safety arc attached to the proximal and distal ends of each blade and positioned in front of the leading edge of each blade.

* * * * *